United States Patent [19]

Baidins et al.

[11] 3,979,342

[45] Sept. 7, 1976

[54] MANUFACTURE OF VESICULATED POLYMER GRANULES

[75] Inventors: Andrejs Baidins; Edward William Gillow, both of Wilmington, Del.

[73] Assignee: E. I. Du Pont de Nemours and Company, Wilmington, Del.

[22] Filed: Sept. 19, 1974

[21] Appl. No.: 507,550

Related U.S. Application Data

[63] Continuation-in-part of Ser. No. 382,175, July 24, 1973.

[52] U.S. Cl. .................... 260/2.5 N; 260/2.5 L; 260/16; 260/29.6 NR; 260/29.6 WA; 260/29.7 NR
[51] Int. Cl.$^2$ ............................................ C08J 9/28
[58] Field of Search ................................. 260/2.5 N

[56] References Cited

UNITED STATES PATENTS

| | | | |
|---|---|---|---|
| 3,255,127 | 6/1966 | Von Bonin | 260/2.5 N |
| 3,740,255 | 6/1973 | Fox | 260/41 C |

FOREIGN PATENTS OR APPLICATIONS

| | | | |
|---|---|---|---|
| 856,861 | 11/1970 | Canada | 260/2.5 N |
| 877,357 | 8/1971 | Canada | 260/2.5 N |
| 884,357 | 8/1971 | Canada | 260/2.5 N |

*Primary Examiner*—Morton Foelak

[57] ABSTRACT

The invention relates to a process for preparing vesiculated cross-linked polyester resin granules by polymerizing a water-in-oil-in-water emulsion formed from a polymerizable water-immiscible oil phase, composed of an ethylenically unsaturated monomer and a polyester condensation product and an aqueous phase. The polymerization is effected essentially instantaneously and substantially immediately following the formation of the emulsion by contacting the water-immiscible oil phase at a temperature from 10° to 40°C. with an aqueous phase containing a strong base and having a temperature from 65° to 95°C. Polymerization is thereby effected while the size of the oil phase globules of the water-in-oil emulsion is at a minimum and before appreciable agglomeration can take place, resulting in a reduction in particle size and particle size distribution. The product is especially useful as an opacifying pigment for latex paints and the like, wherein it contributes improved hiding power.

3 Claims, No Drawings

MANUFACTURE OF VESICULATED POLYMER GRANULES

CROSS-REFERENCE TO RELATED APPLICATION

This application is a continuation-in-part of copending application Ser. No. 382,175 filed July 24, 1973, now abandoned.

BACKGROUND OF THE INVENTION

The production of vesiculated polymer granules and their utility as pigments or paints and other compositions has been described in the literature, e.g., see Kershaw *Australian OCCA Proceedings and News*, August 1971, pages 4–6, 8, 9, Kershaw et al. Canadian Pat. No. 856,861 issued Nov. 24, 1970, and Fox U.S. Pat. No. 3,740,255. As disclosed therein the vesiculated polymer granules, preferably spheroidal granules, have a cell-like structure, the walls of which are provided by the polymer. The granules contain a plurality of cells or vesicles; that is, they are not mono-cellular or balloon-like. Ideally each vesicle is encased in a complete shell of polymer, i.e., the polymer granule does not have a continuous porosity extending from one cell to another, but consists of a plurality of discrete isolated vesicles. A pigment may be provided in the polymer walls or in the vesicles. The ratio of the diameter of the granule to the mean individual vesicle should be at least 5 to 1, the vesicles should occupy from 5 to 95% of the total volume of the granules, and the mean diameter of the granules may be up to 500 microns or more but granules having a mean diameter of 1 to 100 microns are preferred for opacifying agents.

Canadian Pat. No. 877,357 (granted Aug. 3, 1971) describes the production of vesiculated polymer granules converting to solid polymer a liquid medium in which is dispersed particles of another polymer swollen by a liquid swellant, which is itself dispersed in a suspending liquid. The preformed emulsion is polymerized by externally heating the emulsion to temperatures as high as 90°C. in a sealed container for several hours.

Canadian Pat. No. 884,358 (granted Oct. 26, 1971) describes the production of vesiculated cross-linked polyester resin granules by suspending a solution of a carboxylated unsaturated polyester resin in a water-insoluble monomer in an aqueous phase in the presence of a strong base and subsequently polymerizing the resin by externally heating the suspension to about 95° C. for a few hours. Prior to polymerization, the emulsion can be formed in one step by mixing the polyester resin solution with the aqueous phase or in two steps by predispersing an aqueous liquid within the polyester resin solution afterwhich the predispersed solution is mixed with a continuous aqueous phase.

Von Bonin et al. U.S. Pat. No. 3,255,127 describes the production of vesiculated thermoplastic polymers by first forming a water-in-oil emulsion, then dispersing the emulsion in an aqueous phase in the presence of a polymerization catalyst. The oil phase is polymerized by slowly agitating the dispersion at temperatures from 10° to 95°C. for periods 1 to several days.

While the techniques given in the above-discussed art are useful, the resultant vesiculated polymer granules tend to have certain deficiencies, at least for applications where a high quality opacifying pigment is desired. In the case of emulsions contained in an externally heated vessel or even vessels having some form of immersion heater, the oil phase globules in those portions of the emulsion nearest the heat source apparently become most susceptible to coalescence or agglomeration with the result that particle size tends to be unduly large and particle size distribution unduly wide. In fact, the heat source often tends to become coated with agglomerated particles. Where polymerization is effected slowly, with or without heating, the oil phase droplets have a tendency to agglomerate, even when the dispersed oil phase droplets are carefully agitated, resulting in a nongranular or blocky product. Since totally enclosed pores are desirable for maximum hiding power is vesiculated polymers, it will be understood that manual or mechanical breaking, grinding and other deagglomeration procedures commonly practiced in the pigments industry are not altogether satisfactory for use with vesiculated polymers as such procedures contribute to the breakdown of the enclosed pores.

SUMMARY OF THE INVENTION

According to the present invention there is provided an improvement in the process for preparing vesiculated cross-linked polyester granules by polymerizing the oil phase of a water-in-oil-in-water emulsion formed from a. a polymerizable water-immiscible oil phase composed of an ethylenically unsaturated monomer and a polyester obtained from the condensation of one or more polyhydric alcohols and one or more polycarboxylic acids, at least one of said alcohols or acids being unsaturated, b. an aqueous phase, containing a base having a dissociation exponent of less than 8, in which said oil phase is dispersed to form a water-in-oil-in-water emulsion, and c. distributed in at least one of said phases a free-radical polymerization initiator with or without a polymerization promoter. The improvement herein provided resides in effecting the polymerization of said oil phase essentially instantaneously and substantially immediately following the formation of said water-in-oil-in-water emulsion by i. contacting said oil phase at a temperature from 10° to 40°C. with an excess of said aqueous phase at a temperature from 65° to 95°C., said oil phase containing a free-radical polymerization initiator capable of activation at a temperature from 65° to 95°C. in the presence of water, said aqueous phase containing in addition to said base at least one emulsion stabilizing agent selected from the group consisting of surface active agents and nonflocculating polymeric thickeners, ii. recovering the product thereby formed as an aqueous slurry of said vesiculated cross-linked polyester granules.

In addition to the components of the aqueous phase detailed above, small concentration, smallconcentration, i.e., 0.01 to 0.2 molar, of a water-soluble inorganic salt of a strong acid and a strong base, e.g., NaCl, can be added to the aqueous phase to insure especially small pore diameter and complete pore closure in the product.

At relatively low temperatures, e.g. ambient, the oil phase containing a heat-activated initiator has a high gelation time, i.e. the oil phase tends to remain fluid and resist polymerization for at least several minutes. It is known that upon emulsification with an aqueous phase in the presence of a strong base minute globules of oil phase containing entrapped water are formed. Owing to the rapid heat transfer provided by utilizing a hot aqueous according to this invention, polymerization of the oil phase commences before any appreciable agglomeration of the globules of water-in-oil emulsion can occur. Thus the amount of aqueous phase and its temperature should be sufficient to raise the oil phase temperature to a point where polymerization, at least on the surface of the oil phase, commences rapidly, on the order of seconds.

It should be understood that the term "polymerization" as it is used in the above discussion and that which follows refers to the commencement of polymerization on the walls of the oil phase exposed to the aqueous phases to the extent that the walls become sufficiently set to resist collapse upon isolation, agitation or other handling of the product prior to or during use. It is well understood in the art of polymerization that complete cross-linking of the entire polymer chain may require hours to days. All that is necessary to the present invention is that the vesiculated polymer granules so produced are sufficiently set to resist collapse and agglomeration.

The invention can be carried out batchwise and is also readily susceptible of being performed on a continuous basis.

In one embodiment for carrying out the process of the invention on a continuous basis, a stream of oil composition having a relatively low temperature, preferably below 30°C., is continuously merged in a mixing zone with a relatively hot aqueous phase, preferably from 65° to 95°C., in the presence of an initiator such that minute globules of water-in-oil emulsion are formed as a dispersion in the water and simultaneously owing to the rapid heat transfer provided by the hot aqueous phase, polymerization commences before any appreciable agglomeration of the globules can occur. The continuous withdrawal of a portion of the resultant emulsion from the mixing zone serves to minimize contact of oil droplets with the incoming streams, hence further aiding in the prevention of agglomeration. In any case the amount of aqueous phase and its temperature should be sufficient to raise the temperature of the oil composition which forms the dispersed phase of the emulsion, to a point where its surface gelation time is quite low.

DETAILED DESCRIPTION OF THE INVENTION

For practice of the invention in accordance with the above-mentioned techniques, the transformation of the oil phase from a condition where the globules are relatively stable toward polymerization to one where polymerization, at least at the surface of the particles, commences rapidly should occur under agitation and essentially instantaneously, to gel the exterior of the particles, i.e., preferably within about one second advantageously within no more than five seconds. The practice of the invention requires that the polymerization of the oil phase commence below 100°C., since boiling of the aqueous phase will prevent higher temperatures from occurring. To promote uniform heat transfer and facilitate handling the temperature of the aqueous phase should be below the boiling point, i.e., below about 95°C.

It will be understood that the conditions required for the oil phase to commence polymerization will depend upon many factors including type of unsaturated monomer, type of polyester and its acid number, type and amount of initiator, type and amount of promoter if one is used, and, of course, temperature. The influence of such factors in the curing of polymerizable unsaturated monomer polyester compositions is well known in the plastics industry. In this respect reference is made to S. Oleesky et al., *Handbook of Reinforced Plastics of the SPI*, Reinhold Publishers, 1964, Chapter II "Polyester Resins", pages 13–55, and especially the section on "Catalysts and Curing", the latter being specifically incorporated herein by reference.

As a general rule, it is possible by means of a simple test to determine whether or not a particular polymerizable water-immiscible oil phase will be useful in the practice of the invention. Thus if that oil phase in the absence of initiators and promoters is storage stable in bulk form, i.e., wth no water phase present, for a period of at least 10 minutes at a temperature below 100°C. but is capable of gelation in the presence of the initiators and promoters at the same or a higher temperature, also below 100°C., it is then judged to be useful. Gelation and gelation time are described in the aforementioned SPI article.

Of the compositions suitable as polymerizable components of the oil phase utilized in the invention, the unsaturated polyester is selected from condensation polymers which provide both polymerizable unsaturation for coreaction with the unsaturated monomer and carboxyl groups which react with and are at least partially neutralized by an added base. In general the polymer should have a viscosity (as a 70% by weight solution in xylene) of at least Gardner-Holdt E and an acid value of about 5–75 mgm. KOH per gm. Preferably the viscosity should be greater than Gardner-Holdt S and the acid value 25–50 mgm. KOH per gm.

The polyesters are condensation products of polybasic acids (or the corresponding anhydrides) and polyhydric alcohols. Polymerizable unsaturation may be introduced into the molecule by the selection of an $\alpha,\beta$-ethylenically unsaturated acid, optionally in combination with a saturated acid or anhydride. Thus suitable acids are, for example: unsaturated aliphatic acids, e.g., maleic, fumaric, itaconic, citraconic and mesaconic acids; saturated aliphatic acids, e.g., malonic, succinic, glutaric, adipic, pimelic, azelaic and sebacic acids; and saturated aromatic acids, e.g., phthalic, isophthalic, terephthalic, tetrachlorophthalic, tetrahydrophthalic, trimellitic, trimesic and chlorendic acids.

Suitable polyhydric alcohols are chosen from, for example, ethylene glycol, poly(ethylene glycols), e.g., diethylene glycol, hexane-1,6-diol, propylene glycol, dicyclohexanol and neopentyl glycol. Alternatively, the alcohol may be one which initially contains three or more hydroxyl groups, the groups in excess of two optionally being at least in part etherified with, for example, a monohydric alcohol, e.g., methanol, ethanol and n-butanol or esterified with a monobasic acid, e.g., benzoic acid, p-tertbutyl benzoic acid and saturated and unsaturated aliphatic acids of up to 18 carbon atoms chain length. Alternatively the dihydric alcohol may be used in the form of an alkylene oxide, e.g., ethylene oxide and propylene oxide.

The unsaturated monomer in which the polyester is dissolved and cross-linked must be essentially water-insoluble. Water soluble monomers, such as methyl methacrylate, causes high yield loss and coagulation of product granules. It will typically comprise 40–80% by weight of the polymerizable composition. A single monomer or a mixture of monomers may be used.

The preferred monomers are styrene, α-methyl styrene, vinyl toluene, divinyl benzene, tetraallyl ethoxy ethane, and certain esters of acrylic and methacrylic acids having a negligible solubility in water, such as ethylene glycol dimethacrylate, and trimethylolpropane trimethacrylate.

Since polymerization of the oil phase is commenced by the action of the heat supplied by the hot aqueous phase on a free-radical initiator, the initiator should be activated at temperatures from 65° to 95°C. and not be adversely affected by the presence of water. It is desirable that the initiator be essentially water-insoluble and be contained in the oil phase prior to emulsification. Suitable initiators include water-insoluble organic peroxides, such as benzoyl peroxide and t-butyl peroxybenzoate and bis-azo nitriles, such as 2'2'-azobis-(isobutyronitrile). Some water-soluble initiators, such as methyl ethyl ketone peroxide, can be used if additionally activated by a polymerization promoter, e.g., cobalt naphthenate, in the oil phase.

Although there is generally no need to use polymerization promoters in the practice of the invention, except as noted above, promoters which may optionally be used in conjunction with one of the aforementioned initiators include dimethyl aniline, diethyl aniline and cobalt octoate.

The aqueous phase utilized to prepare the water-in-oil-in-water emulsion according to the invention contains water as a major component, a surface active agent and/or polymeric thickener should be included to stabilize the system. A surface-active agent such as water-soluble partially hydrolyzed polyvinylacetate, typically of molecular weight 100,000, is advantageous in stabilizing the emulsion and preventing coalescence. In general a concentration 1.0% by weight of the polyvinylacetate types of surface-active agents in the aqueous continuous phase usually gives satisfactory results. Thickeners useful in the practice of the invention are polymeric thickeners of the nonflocculating type, particularly polysaccharide types, e.g., water-soluble ethers of cellulose, especially hydroxy ethyl cellulose. Such thickeners inhibit settling of the suspended oil phase globules and favor formation of smaller globules by facilitating the shear transfer between the oil phase and aqueous phase. Thickeners are typically used at concentrations of 0.02–1.0% by weight of the aqueous phase.

The water-soluble base contained in the aqueous phase must be a strong base, by which is meant a base which is capable of at least partially ionizing the carboxyl groups of the unsaturated polyester resin, to give a stable aqueous dispersion of polyester. In general, such a base will have a dissociation exponent of less than 8, preferably less than 5. By a dissociation exponent is meant $-\log_{10}K_b$ where $K_b$ is the dissociation constant of the base in water at 25°C. Suitable strong bases are, for example: inorganic bases, e.g., sodium, potassium, lithium and ammonium hydroxides and their corresponding carbonates; water-dispersible aliphatic amines, for example: ethylene diamine, diethylene triamine, butyl amine, dimethylamine, trimethylamine, 2-amino-2-methyl-1-propanol, and dimethyl aniline. Among other bases that may be used mention is made of ethanolamine, morpholine, pyrrolidone, piperidine and methane diamine. Mixtures of the bases may also be used.

The amount of base used is related to the free carboxyl groups of the polyester, usually being between 0.3 and 10 equivalents of base per carboxyl group. The base should be added to the aqueous phase prior to emulsification, rather than added to the oil phase, in order to achieve a highly porous product. For example, when the base is added directly to the oil phase, the resulting product is only about 20% porous, whereas when added to the aqueous phase the resulting product is 65% porous.

Though not essential to a satisfactory product, to decrease mean pore diameter and insure closure of any pores which may exist on the surface of the oil phase globule upon polymerization, it is desirable to add to the aqueous phase in low concentration, i.e., about 0.01–0.2 molar, a water-soluble inorganic salt of a strong acid and a strong base, e.g., sodium chloride, sodium sulfite or potassium nitrate.

The process of the invention is especially useful for the production of opacifying pigments, such as the type to be used in latex paint compositions where matte surfaces of outstanding stain and scrub resistance are desired. For such pigmentary applications it is highly advantageous to provide a substantial proportion of an inorganic pigmentary material in the granules. To insure complete incorporation of the inorganic pigmentary material into the vesiculated polymer granules, the pigmentary material must be added to the oil phase prior to contacting the oil phase with the hot aqueous phase. To minimize loss of inorganic pigmentary material in the aqueous phase, the inorganic pigmentary material added to the oil phase should desirably be sufficiently oleophilic so that it tends to remain in the oil phase during processing. Although clay, various types of metal oxides and other inorganic materials can be used, rutile $TiO_2$ is preferred. The amount of such inorganic material can be varied widely but in general the solids content of the granules should be composed of about 30–80%, preferably 40–60%, of such an inorganic material to achieve optimum opacity effects.

The vesiculated granules formed in accordance with the practice of the invention may be mechanically separated from the aqueous continuous phase and dried or they may be incorporated as an aqueous slurry directly into suitable aqueous composition, e.g., water-thinnable paint.

Practice of the present invention typically results in vesiculated polymer granules having a maximum diameter of 30 microns and a median diameter below 15 microns. Individual vesicles in the granules will normally be in the range of 0.1–2 microns, and the ratio of the diameter of the granule to the median individual vesicle will typically be at least 5:1. In general the products of the invention will have porosity values of at least 30% and most often of at least 50%.

The examples below illustrate practice of the invention, parts and percentages therein are by weight unless otherwise indicated.

EXAMPLE I

This example illustrates the practice of the invention as performed in a batch-type operation.

An aqueous phase is prepared by mixing and combining the following ingredients in a vessel:
  800 gm distilled $H_2O$
  12 gm partially hydrolyzed polyvinylacetate
  6.4 gm hydroxyethylcellulose
  2 gm $(NH_4)_2 CO_3$ The mixture is heated in a steam-jacketed pot, attaining a temperature on the order of about 95°C.

An oil phase is prepared by mixing at room temperature 50 gm rutile $TiO_2$ pigment, 0.5 gm benzoyl peroxide and 50 gm of a medium thioxtropic polymerizable composition formed from 60 parts of an unsaturated polyester resin and 40 parts styrene. The unsaturated polyester component therein is prepared by conventional means from the polymerization/condensation of fumaric acid, phthalic anhydride and propylene glycol in the approximate molar proportions of 3:1:4, with 0.04% hydroquinone added as an inhibitor. The polyester/styrene resin has an acid value of 54.5 mgm KOH per gm, a specific gravity at 25°C. of 1.10 and a viscosity (Brookfield LVF No. 2 spindle at 12 rpm) at 20°C. of 400 centipoises.

The mixing apparatus for effecting the emulsification consists of a drill press equipped with a 7.5 cm diameter sawtooth rotary blade. A vessel containing the hot aqueous phase is placed under the dispenser so that the edge of the blade is just below the liquid level when running at operating speed. The speed of the blade is adjusted to just under 2000 rpm. Thereupon the oil is poured in a thin stream of the rotary blade. A small amount of foam which has formed with the commencement of the stirring quickly disappears as the oil phase is added. The shaft speed is then raised to 2000 rpm and the addition of the oil phase continued the total addition time being 1–2 minutes. The exothermic heat generated by the rapid polymerization serves to maintain the emulsion hot throughout the addition of the oil phase. After the addition is complete, the vessel is sealed and the slurry allowed to settle. Thereafter the supernatant liquid above the settled polymer granules is decanted. Without further removal of water, the settled slurry can directly be incorporated in aqueous-based paints or the settled slurry can be filtered, washed, and dried to isolate the polymer granules.

The polymer granules prepared are filtered and dried under vacuum at about 30°C. Electron micrographs of the dried grandules reveal that the individual spherical-shaped resin granules contain dispersed pigment and a plurality of empty vesicles. Nearly all of the granules are in the 3–15 micron size range with individual vesicles being in the range of 0.1 to 2 microns. The bulk density of the dried grandules is 0.53 gm/cc which indicates a void content of about 60% by volume.

EXAMPLE II

This example illustrates the practice of the invention as performed in a continuous operation with simultaneous emulsification/polymerization.

An aqueous phase is prepared by mixing and combining the following ingredients in a vessel:
27.2 kg distilled $H_2O$
200 gm partially hydrolyzed polyvinylacetate
115 gm hydroxyethylcellulose
6.8 gm sodium chloride and
6.8 gm defoamer (Nopco NDW)

The mixture is heated to 72°C. by sparging steam therein while stirring and 272 gm $(NH_4)_2CO_3$ added just prior to emulsification.

An oil phase is prepared by mixing in a stirred vessel in a water bath (to maintain a temperature below 25°C.) 2.72 kg rutile $TiO_2$ pigment and 3.40 kg of a medium thixotropic polymerizable composition formed from 60 parts of an unsaturated polyester resin and 40 parts styrene. The unsaturated polyester component therein is prepared by conventional means from the polymerization/condensation of maleic anhydride, phthalic anhydride and propylene glycol in the approximate molar proportions of 1:2:3. The polyester/styrene resin has an acid value between about 24 and 42 mgm KOH per gm, a specific gravity at 25°C. of 1.10–1.12 and a viscosity (Brookfield LVF No. 2 spindle at 12 rpm) at 20°C. of 450–550 centipoises. Just prior to emulsification 136 gm of a 50% dispersion of benzoyl peroxide in tricresyl phosphate is added under an $N_2$ blanket and mixed for 1 minute.

A 76 liter/min. capacity (at room temperature) centrifugal pump is employed to effect emulsification. The inlet thereto is connected to two conduits, one being smaller and mounted inside of and concentrically of the other. The outer conduit is used to feed the aqueous phase from a storage supply into the pump, the inner one to feed the oil phase from a separate storage supply into the pump. Mixing, emulsification, and the commencement of polymerization take place within the pump. Manually operated valve arrangements for flow control are provided in each conduit and in the single outlet line. The valve arrangement in the outlet line is of the two-way type, one port connecting to a product collection vessel and the other connecting to the storage supply for the aqueous phase for recirculating aqueous fluid. In this system the dwelltime of an emulsion particle in the high-shear region of the pump is less than a second and exposure to air is completely eliminated.

Before the emulsification is begun, the preheated aqueous phase alone is cycled through the pump until a constant 70°C. temperature is reached. Then the oil phase feed valve assembly is opened, the recycling of aqueous phase discontinued, and the product collected (pH is about 8). On a volume basis the feed of aqueous phase to oil phase is approximately 4:1. With the given amount of materials the emulsification is completed in about 2 minutes and 41 seconds. The product, already virtually cured is allowed to stand overnight. It is then screened through a 200 mesh screen (U.S. standard sieve) and, allowed to settle, and excess water decanted to produce a 29% solids slurry of pH 8.4.

Examination of the resultant product shows a small particle size, a very narrow particle size distribution, practically no agglomeration, excellent tinting strength and high porosity as shown below:

| Median Part. /Standard Dia. ($\mu$) /Deviation | Tinting Strength | Vol. % Porosity |
|---|---|---|
| 8.1 ± 16% | 152 | 63% |

EXAMPLE III

The procedure of Example II is followed but with a few changes.

The polymerizable composition is formed of a mixture of 40 parts styrene and 60 parts of a polyester obtained by condensing, to an acid value of 45 mgm KOH per gm, propylene glycol, fumaric acid and phthalic anhydride in the approximate mol ratio of 4.3:1, about 0.04% hydroquinone being added as an inhibitor.

The amount of $(NH_4)_2CO_3$ used in the aqueous phase is reduced by half, as are the amounts of polymerizable composition, $TiO_2$ and benzoyl peroxide. A constant temperature of 68°C. is maintained in the pump before and during emulsification. On a volume basis the feed of aqueous phase to oil phase is approximately 8:1. After continuous operation for 3 minutes, 45 seconds the supplies of aqueous and oil phases are exhausted.

Examination of the resultant product shows a small particle size, a very narrow particle size distribution, practically no agglomeration, excellent tinting strength and high porosity as shown below:

| Median Part. /Standard Dia. ($\mu$) /Deviation | Tinting Strength | Vol. % Porosity |
|---|---|---|
| 12 ± 43% | 144 | 73 |

The following test procedures are used in the examples unless otherwise stated:

Porosity (in volume %) is estimated from a gravimetric measurement of bulk density of the granules which are assumed to pack to 70.8% volume filling.

Particle size and size distribution are measured with a Coulter Counter. The instrument counts particles of a very dilute dispersion in 12 selected volume classes. The count is triggered by the abrupt increase of electrical resistance of a column of electrolyte in a small orifice that occurs as particles traverse the orifice. Raw data are converted to Median Diameter (by Weight) and Relative Geometric Standard Deviation. The latter is indicative of particle size distribution. Thus for example a product having a Median Diameter by Weight of 16 microns + 50% means that two-thirds (68.3%) of sample weight consists of beads larger than 8 and smaller than 24 microns.

Tinting strength or the relative scattering coefficient of the vesiculated polyester granules in an emulsion paint is measured by dispersing a slurry of particles in a black emulsion paint. The paint is drawn to complete hiding, reflectance is measured through a green filter and tinting strength calculated from reflectances and solids contents of sample and standard. The tinting strength result is expressed as percent of a conventional rutile pigment.

What is claimed is:

1. In a process for preparing vesiculated crosslinked polyester granules by polymerizing the oil phase of a water-in-oil-in-water emulsion formed from (a) a polymerizable water-immiscible oil phase composed of an ethylenically unsaturated monomer and a polyester obtained from the condensation of one or more polyhydric alcohols and one or more polycarboxylic acids, at least one of said alcohols or acids being unsaturated, (b) an aqueous phase, containing a base having a dissociation exponent of less than 8 in which said oil phase is dispersed to from a water-in-oil-in-water emulsion, and (c) distributed in at least one of said phases a free-radical polymerization initiator with or without a polymerization promoter, wherein the improvement comprises effecting the polymerization of said oil phase essentially instantaneously and substantially immediately following the formation of said water-in-oil-in-water emulsion by i. contacting said oil phase at a temperature from 10° to 40°C. with said aqueous phase at a temperature from 65° to 95°C.

said oil phase containing a free-radical polymerization initiator capable of activation at a temperature from 65° to 95°C. in the presence of water, said aqueous phase containing in addition to said base at least one emulsion stabilizing agent selected from the group consisting of surface active agents and nonflocculating polymeric thickeners, ii. recovering the product thereby formed as an aqueous slurry of said vesiculated cross-linked polyester granules.

2. Process according to claim 1 where said aqueous phase of step (i) additionally contains from 0.01 to 0.2 molar of a water-soluble inorganic salt of a strong acid and a strong base.

3. Process according to claim 2 where said inorganic salt is sodium chloride.

* * * * *